(12) United States Patent
Shen et al.

(10) Patent No.: US 9,915,856 B2
(45) Date of Patent: Mar. 13, 2018

(54) PROJECTION APPARATUS AND LENS MODULE

(71) Applicant: Coretronic Corporation, Hsin-Chu (TW)

(72) Inventors: Chien-Chi Shen, Hsin-Chu (TW); Mao-Jen Hsu, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 0 days.

(21) Appl. No.: 15/175,332

(22) Filed: Jun. 7, 2016

(65) Prior Publication Data

US 2017/0010522 A1  Jan. 12, 2017

(30) Foreign Application Priority Data

Jul. 7, 2015  (CN) .......................... 2015 1 0392653

(51) Int. Cl.
*G03B 21/14* (2006.01)
*G02B 7/02* (2006.01)
*G03B 21/00* (2006.01)

(52) U.S. Cl.
CPC .......... *G03B 21/142* (2013.01); *G02B 7/023* (2013.01); *G03B 21/145* (2013.01); *G03B 21/005* (2013.01)

(58) Field of Classification Search
CPC .......... G02B 7/02; G03B 21/00; G03B 21/14
See application file for complete search history.

(56) References Cited

U.S. PATENT DOCUMENTS

| 7,055,971 | B2 | 6/2006 | Gishi |
| 7,164,546 | B2 | 1/2007 | Miyashita et al. |
| 2004/0114115 | A1 | 6/2004 | Runco |
| 2009/0040479 | A1* | 2/2009 | Liao ........................ G03B 5/02 353/101 |

FOREIGN PATENT DOCUMENTS

| CN | 1353320 A | 6/2002 |
| CN | 101290462 A | 10/2008 |
| CN | 101398520 A | 4/2009 |
| CN | 102004294 A | 4/2011 |
| CN | 104678528 A | 6/2015 |
| JP | 2006301424 A | 11/2006 |
| TW | 201030445 A1 | 8/2010 |

* cited by examiner

*Primary Examiner* — Sultan Chowdhury
*Assistant Examiner* — Danell L Owens

(57) ABSTRACT

A projection apparatus includes a light source, an optical engine module, and a lens module. The lens module includes a plate having at least one through hole, a lens fixed to the plate, at least one slide assembly disposed between the plate and an optical engine housing of the optical engine module, and a position adjusting device including a movable guide member and at least one guide pillar. The plate is movably disposed on the optical engine housing through the slide assembly. The movable guide member is movably disposed between the plate and the optical engine housing. The guide pillar is disposed on the movable guide member and passes through the through hole. When the movable guide member is forced to move towards an axial direction, the guide pillar drives the plate to move on the slide assembly along the axial direction relative to the optical engine housing.

16 Claims, 6 Drawing Sheets

PROJECTION APPARATUS AND LENS MODULE

FIELD OF THE INVENTION

The present invention relates to a projection apparatus, and more particularly to a projection device having a movable lens module.

BACKGROUND OF THE INVENTION

Through a movable lens module, the lens of a projection apparatus has horizontal and vertical movements, and thus the image beam is projected onto a specific area on a screen or on a wall. The conventional movable lens module is assembled sequentially by a fixture base, a vertical plate, and a horizontal plate, and the lens is assembled to the horizontal or vertical plate. Through driving the horizontal plate and the vertical plate of the conventional movable lens module, the lens moves in the horizontal movement and vertical movement accordingly.

Conventionally, the lens module adopts two plates for the horizontal and vertical movements. Thus, the conventional lens module as well as the convention projection apparatus has higher cost, complicated structure and high manufacturing difficulty. Therefore, providing solutions for the aforementioned issues is quite important in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One object of the invention is to provide a projection apparatus including a light source, an optical engine module, and a lens module. The lens module includes a position adjusting device for improving the accuracy and stability of the movement of the lens module. In addition, the lens module has simple structure and lower component cost.

Another object of the invention is to provide a lens module. The lens module includes a position adjusting device for improving the accuracy and stability of the movement of the lens module. In addition, the lens module has simple structure and lower component cost.

Other objects and advantages of the invention can be further illustrated by the technical features broadly embodied and described as follows.

In order to achieve one or a portion of or all of the objects or other objects, the invention provides a projection apparatus. The projection apparatus includes a light source, an optical engine module, and a lens module. The light source is configured to provide an illumination beam. The optical engine module includes an optical engine housing and a light valve. The light valve is accommodated in the optical engine housing, and configured to convert the illumination beam into an image light beam. The lens module is configured to convert the image light beam into a projection beam. The lens module includes a plate, a lens, at least one slide assembly, and a first position adjusting device. The plate has at least one first through hole. The lens is fixed to the plate. The slide assembly is disposed between the plate and the optical engine housing. The plate is movably disposed on the optical engine housing through the slide assembly. The first position adjusting device includes a first movable guide member and at least one first guide pillar. The first movable guide member is movably disposed between the plate and the optical engine housing. The first guide pillar is disposed on the first movable guide member and passes through the first through hole. The first movable guide member is configured to be forced to move towards a first axial direction, thereby the first guide pillar drives the plate to move on the slide assembly along the first axial direction relative to the optical engine housing.

In order to achieve one or a portion of or all of the objects or other objects, the invention further provides a lens module adapted to a projection apparatus. The lens module includes a plate, a lens, at least one slide assembly, and a first position adjusting device. The plate has at least one first through hole. The lens is fixed to the plate. The slide assembly is disposed between the plate and an optical engine housing of the projection apparatus. The plate is movably disposed on the optical engine housing through the slide assembly. The first position adjusting device includes a first movable guide member and at least one first guide pillar. The first movable guide member is movably disposed between the plate and the optical engine housing. The first guide pillar is disposed on the first movable guide member and passes through the first through hole. The first movable guide member is configured to be forced to move towards a first axial direction, thereby the first guide pillar drives the plate to move on the slide assembly along the first axial direction relative to the optical engine housing.

In one embodiment of the projection apparatus and the lens module of the invention, the first position adjusting device further includes a first adjustment member. The first adjustment member is coupled to the first movable guide member and configured to drive the first movable guide member to move towards the first axial direction, thereby making the first guide pillar drive the plate to move on the slide assembly along the first axial direction.

In one embodiment of the projection apparatus and the lens module of the invention, the first through hole extends along a second axial direction. The plate further has at least one second through hole. The second through hole extends along the first axial direction, and the second axial direction is substantially perpendicular to the first axial direction.

In one embodiment of the projection apparatus and the lens module of the invention, the lens module further includes a second position adjusting device. The second position adjusting device includes a second movable guide member and at least one second guide pillar. The second movable guide member is movably disposed between the plate and the optical engine housing. The second guide pillar is disposed on the second movable guide member and passes through the second through hole. The second movable guide member is configured to be forced to move towards the second axial direction, thereby the second guide pillar drives the plate to move on the slide assembly along the second axial direction relative to the optical engine housing.

In one embodiment of the projection apparatus and the lens module of the invention, the second position adjusting device further includes a second adjustment member. The second adjustment member is coupled to the second movable guide member and configured to drive the second movable guide member to move towards the second axial direction, thereby making the second guide pillar drive the plate to move on the slide assembly along the second axial direction.

In one embodiment of the projection apparatus and the lens module of the invention, the lens module further includes at least one first guide rail, at least one second guide rail, at least one first slidable groove, and at least one second slidable groove. The first guide rail is disposed between the optical engine housing and the first movable guide member. The second guide rail is disposed between the optical engine housing and the second movable guide member. The first slidable groove is disposed on the first movable guide member and movably disposed on the first guide rail. The second slidable groove is disposed on the second movable guide member and movably disposed on the second guide rail. Through the first slidable groove moving on the first guide rail, the first movable guide member moves between the optical engine housing and the plate. Through the second slidable groove moving on the second guide rail, the second movable guide member moves between the optical engine housing and the plate.

In one embodiment of the projection apparatus and the lens module of the invention, a quantity of the at least one slide assembly is plural. Each of the slide assemblies includes a housing, an elastic member, and a rolling member. The housing is disposed between the plate and the optical engine housing. The housing has an opening facing the plate. The elastic member is disposed in the housing. The rolling member is disposed on the housing and located between the elastic member and the plate. Through an elastic resilience force of the elastic member, a portion of the rolling member is exposed from the opening.

In one embodiment of the projection apparatus and the lens module of the invention, the lens module further includes a plurality of fixing members. The plate further has a plurality of via holes. The optical engine housing has a plurality of fixing holes, and the via holes respectively correspond to the fixing holes. Each of the fixing members is fixed to the corresponding fixing hole by passing through the corresponding via hole, so that the plate is movably disposed on the optical engine housing through contacting the slide assembly.

In summary, in the embodiments of the invention, the lens module in the projection apparatus of may have a movement/motion of two-dimensional (for example, horizontal and/or vertical) direction by using the position adjusting device. In the embodiment of the invention, through the guide pillar of the position adjusting device passing through the through hole of the plate and the slide assembly being disposed between the optical engine housing and the plate, the guide pillar may drive the plate to move on the slide assembly along the horizontal direction and/or vertical direction when the movable guide member of the position adjusting device is forced/driven by an external force. Thus, the projection apparatus of the embodiments of the invention may make the lens module thereof have adjustment function of two-dimensional direction by a single plate. Compared with the conventional projection apparatus equipped with two plates, the projection apparatus of the embodiments of the invention has simple structure and lower component cost and the lens module of the embodiments of the invention may move in the horizontal direction or vertical direction through a single plate. Additionally, in the embodiments of the invention, the plate would not directly contact the optical engine housing due to that the slide assembly is disposed between the optical engine housing and the plate; thus, when the lens module moves, a damage caused by friction between the optical engine housing and the plate of the lens module is avoided.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
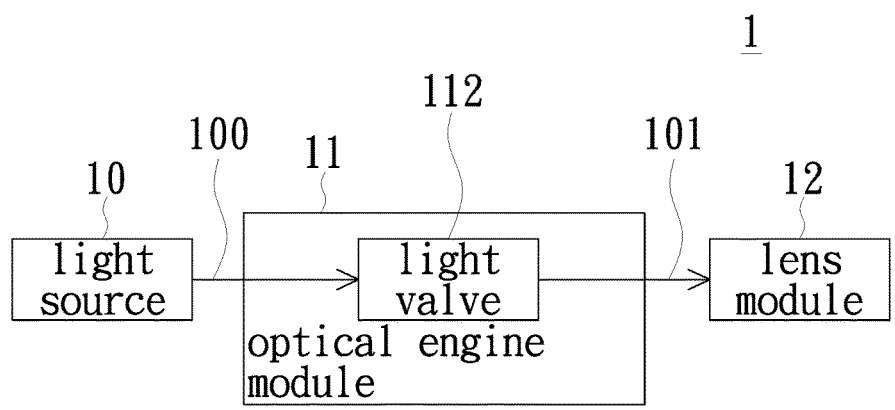
FIG. 1 is a schematic block diagram of a projection apparatus in accordance with an embodiment of the invention.

FIG. 1 is a schematic block diagram of a projection apparatus in accordance with an embodiment of the invention. As shown in FIG. 1, the projection apparatus 1 in the embodiment includes a light source 10, an optical engine module 11, and a lens module 12. The light source 10 is configured to provide an illumination beam 100. The optical engine module 11 includes an optical engine housing (not shown and will be described in detail later) and a light valve 112. In the embodiment, the light valve 112 is accommodated in and disposed in the optical engine housing, and configured to convert the illumination beam 100 into an image light beam 101. The lens module 12 is configured to convert the image light beam 101 into a projection beam (not shown).

The detailed structures of the optical engine module 11 and the lens module 12 in FIG. 1 will be described in the following embodiments.

Figure 2:
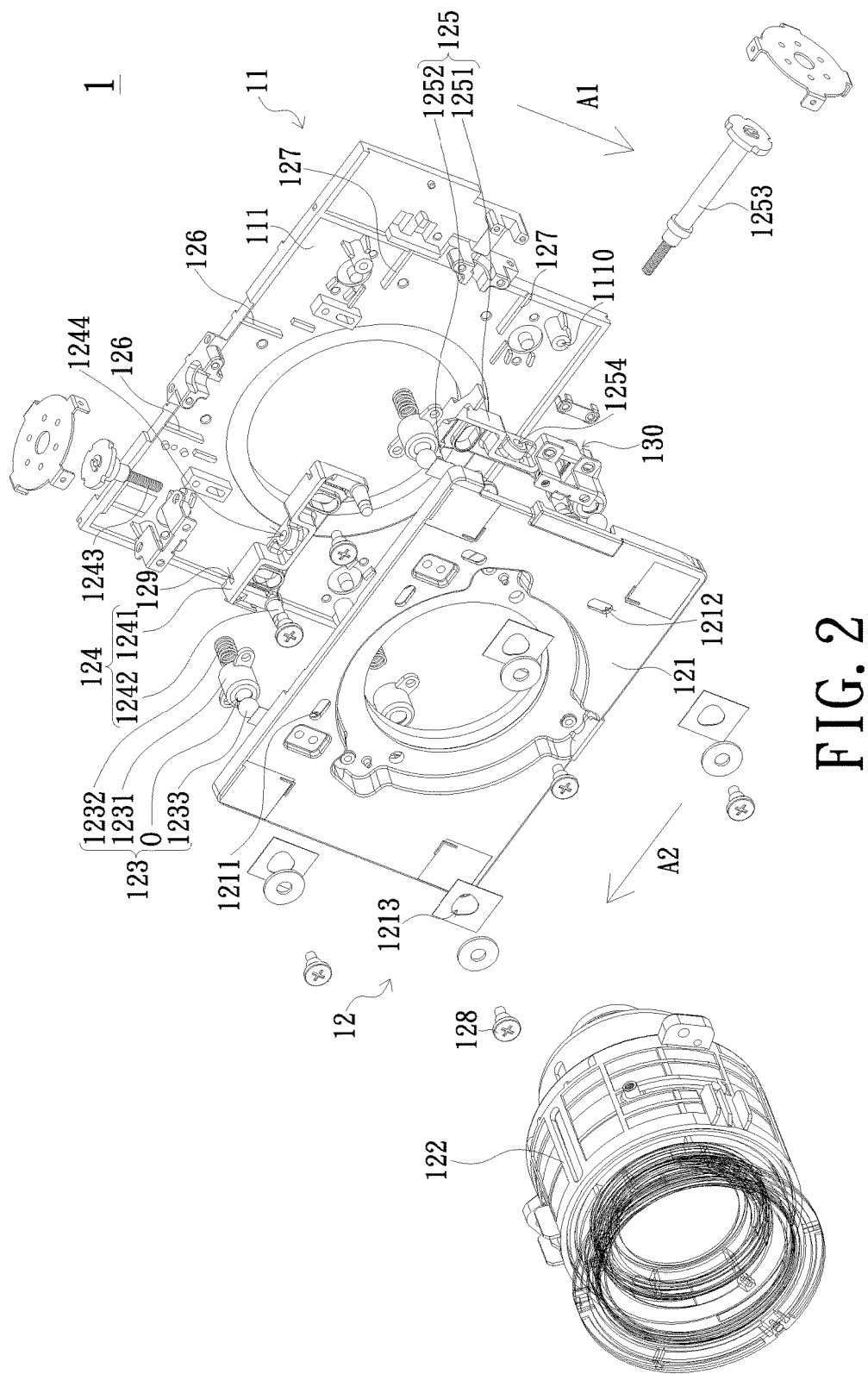
FIG. 2 is a schematic exploded diagram of the lens module of the projection apparatus in accordance with an embodiment.
Figure 3A:
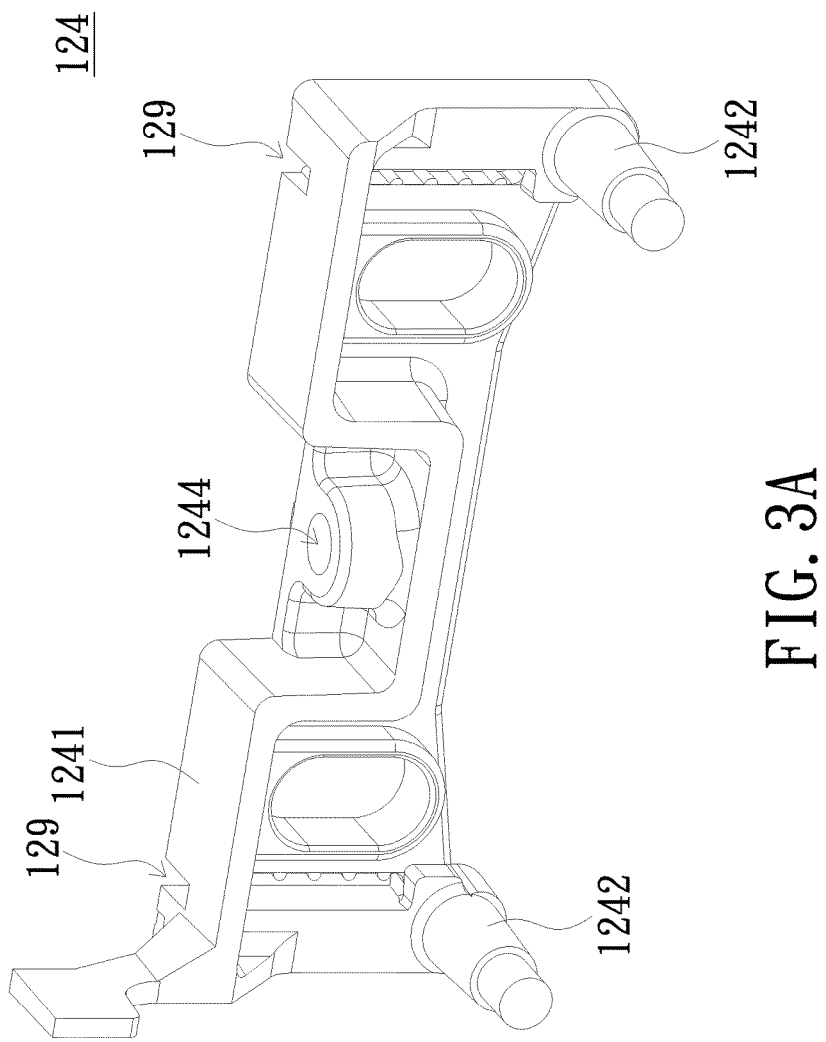
FIG. 3A is a schematic structural diagram of a position adjusting device in FIG. 2 in accordance with an embodiment of the invention.
Figure 3B:
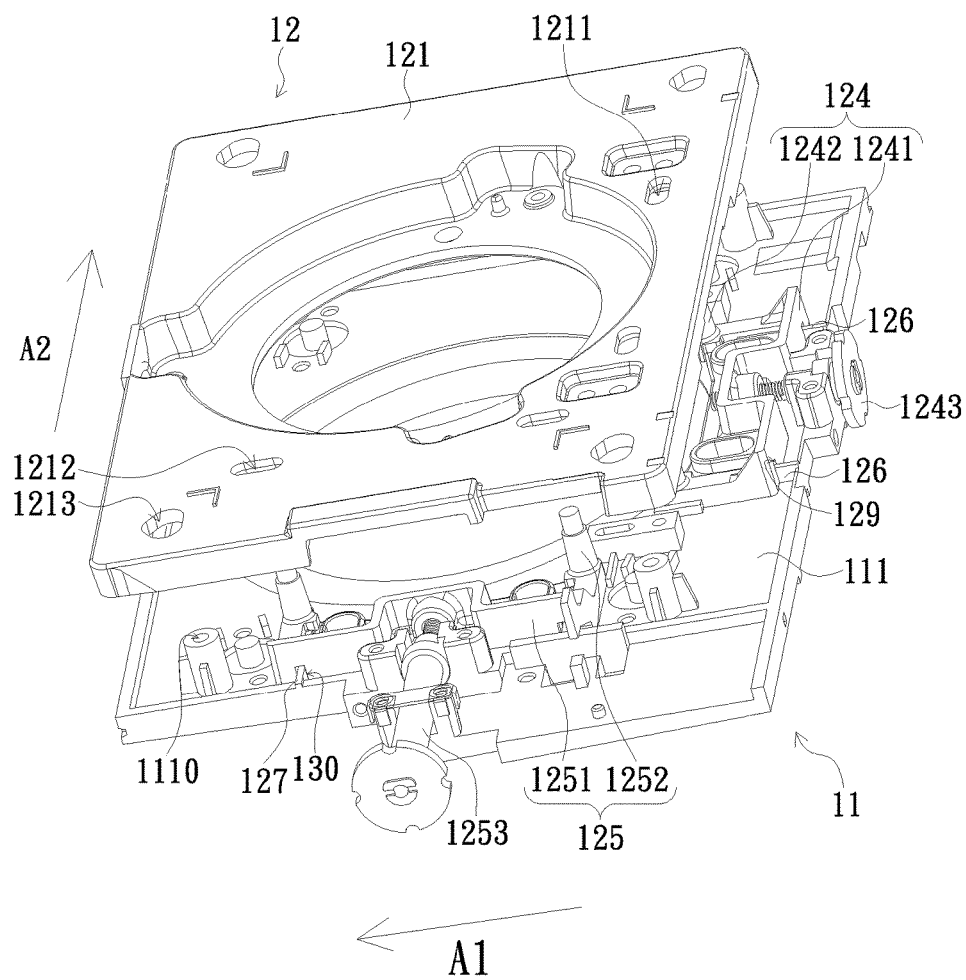
FIG. 3B is a schematic structural diagram of the projection apparatus shown from another viewing angle in accordance with an embodiment.
Figure 4:
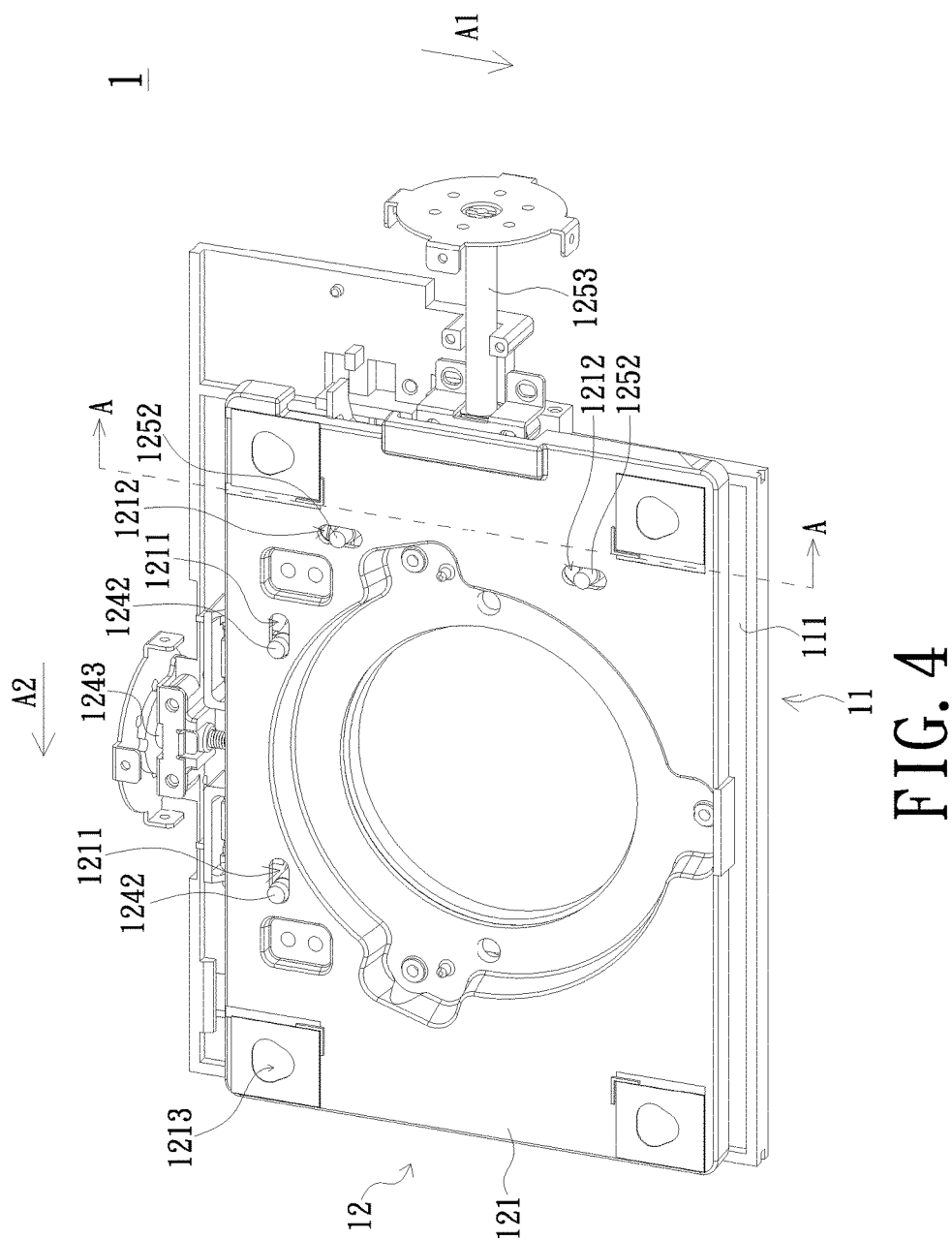
FIG. 4 is a schematic assembling diagram of the lens module in the projection apparatus in FIG. 2.
Figure 5:
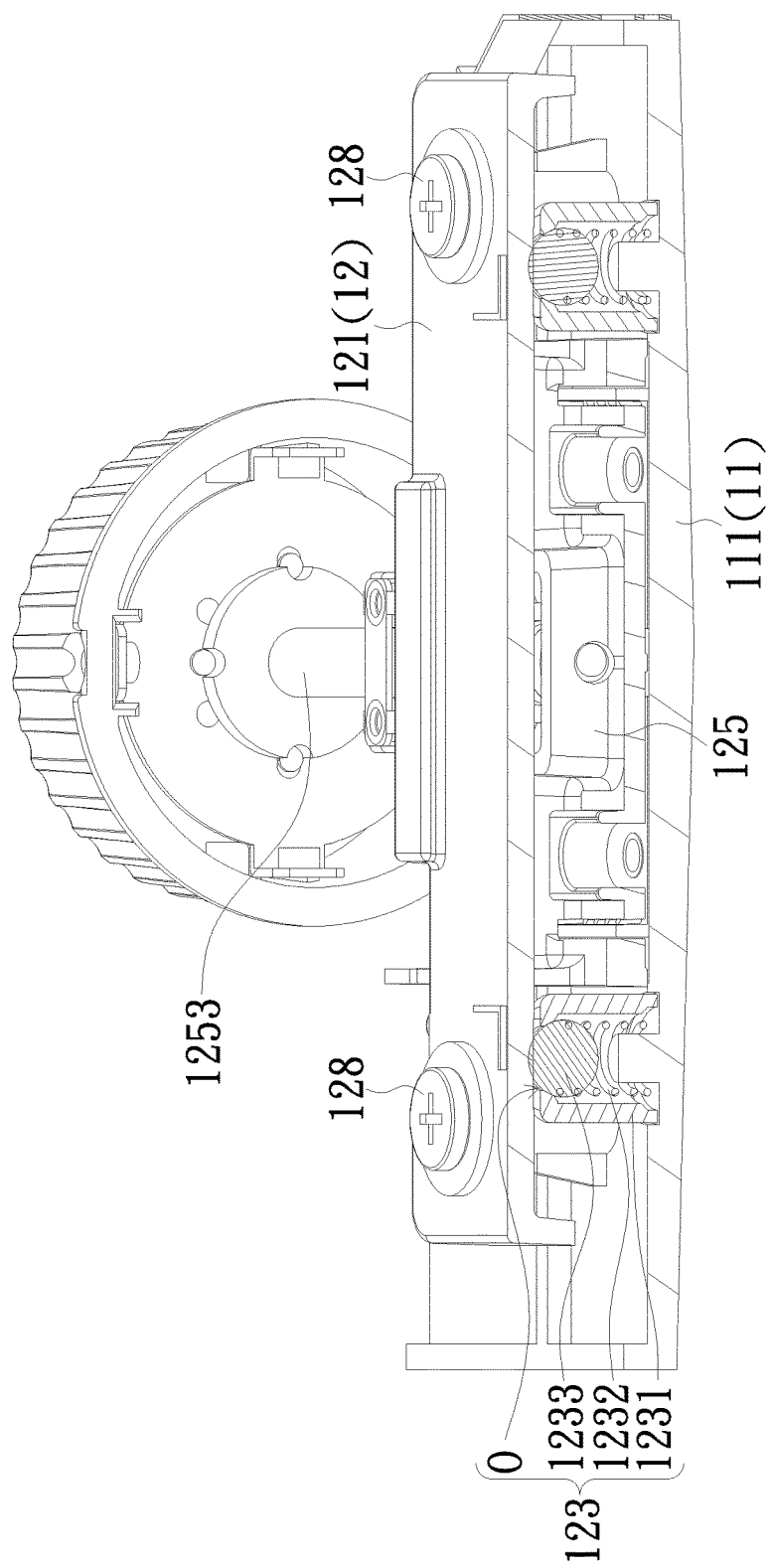
FIG. 5 is a schematic cross sectional diagram of the lens module of the projection apparatus in FIG. 4 along a line A-A.

FIG. 2 is a schematic exploded diagram of the lens module of the projection apparatus in accordance with an embodiment. FIG. 3A is a schematic structural diagram of a position adjusting device in FIG. 2 in accordance with an embodiment. FIG. 3B is a schematic structural diagram of the projection apparatus shown from another viewing angle in accordance with an embodiment. FIG. 4 is a schematic assembling diagram of the lens module in the projection apparatus in FIG. 2. FIG. 5 is a schematic cross sectional diagram of the lens module of the projection apparatus in FIG. 4 along a line A-A. Please refer to FIGS. 2 to 5, the lens module 12 in the embodiment includes a plate 121, a lens 122, at least one slide assembly 123, and a first position adjusting device 124. In the embodiment, the plate 121 has at least one first through hole 1211. The lens 122 is fixed to the plate 121. The slide assembly 123 is disposed between the plate 121 and an optical engine housing 111. Through the slide assembly 123, the plate 121 is movably disposed on the optical engine housing 111. The first position adjusting device 124 includes a first movable guide member 1241 and at least one first guide pillar 1242. The first movable guide member 1241 is movably disposed between the plate 121 and the optical engine housing 111. In the embodiment, the first guide pillar 1242 is disposed on the first movable guide member 1241 and extends to pass through the first through hole 1211 of the plate 121 in a direction towards the plate 121. When the first movable guide member 1241 is forced/driven (such as push) by an external force to move towards a first axial direction A1, the first guide pillar 1242 drives the plate 121 to move on the slide assembly 123 along the first axial direction A1 relative to the optical engine housing 111. The embodiment of the first movable guide member 1241 being forced/driven by an external force will be described in detailed as follow.

As shown in FIGS. 2 to 5, the first position adjusting device 124 of the embodiment further includes a first adjustment member 1243. In the embodiment, the first adjustment member 1243 is located on one side of the first movable guide member 1241. Specifically, the first adjustment member 1243 is coupled to the first movable guide member 1241 through a connecting hole 1244 connected to the first movable guide member 1241. In the embodiment, the first adjustment member 1243 is configured to drive (such as push) the first movable guide member 1241 to move towards the first axial direction A1, thereby making the first guide pillar 1242 drive the plate 121 to move on the slide assembly 123 along the first axial direction A1 relative to the optical engine housing 111. Specifically, the first through hole 1211 of the embodiment extends along a second axial direction A2, and the second axial direction A2 is substantially perpendicular to the first axial direction A1. When the first adjustment member 1243 drives (such as push) the first movable guide member 1241 to move towards the first axial direction A1, the first guide pillar 1242 drives the plate 121 to move towards the first axial direction A1 through being against an inner wall of the first through hole 1211. In the embodiment, the first adjustment member 1243 is, for example, a knob extending outside of a housing of the projection apparatus 1, and accordingly a user may rotate the first adjustment member 1243 (knob) to make the first adjustment member 1243 drive (such as push) the first movable guide member 1241 to move towards the first axial direction A1.

As shown in FIGS. 2 to 5, the plate 121 of the embodiment further has at least one second through hole 1212, and the second through hole 1212 extends along the first axial direction A1 for example. The lens module 12 of the embodiment further includes a second position adjusting device 125. In the embodiment, the second position adjusting device 125 includes a second movable guide member 1251 and at least one second guide pillar 1252. In the embodiment, the second movable guide member 1251 may be movably disposed between the plate 121 and the optical engine housing 111. In the embodiment, the second guide pillar 1252 is disposed on the second movable guide member 1251 and extends to pass through the second through hole 1212 in a direction towards the plate 121. When the second movable guide member 1251 is driven (such as push) by an external force to move towards the second axial direction A2 which is substantially perpendicular to the first axial direction A1, the second guide pillar 1252 may drive the plate 121 to move on the slide assembly 123 along the second axial direction A2 relative to the optical engine housing 111. However, since the first position adjusting device 124 and the second position adjusting device 125 have the similar stricture(s) in the embodiment, only the first position adjusting device 124 is shown in FIG. 3A for brevity.

As shown in FIGS. 2 to 5, the second position adjusting device 125 of the embodiment further includes a second adjustment member 1253. In the embodiment, the second adjustment member 1253 is located on one side of the second movable guide member 1251. Specifically, the second adjustment member 1253 is coupled to the second movable guide member 1251 through a connecting hole 1254 connected to the second movable guide member 1251. In the embodiment, the second adjustment member 1253 is configured to drive (such as push) the second movable guide member 1251 to move towards the second axial direction A2, thereby making the second guide pillar 1252 drive the plate 121 to move on the slide assembly 123 along the second axial direction A2 relative to the optical engine housing 111. Specifically, the second through hole 1212 of the embodiment extends along the first axial direction A1, and the first axial direction A1 is substantially perpendicular to the second axial direction A2. When the second adjustment member 1253 drives (such as push) the second movable guide member 1251 to move towards the second axial direction A2, the second guide pillar 1252 drives the plate 121 to move towards the second axial direction A2 through being against an inner wall of the second through hole 1212. In the embodiment, the second adjustment member 1253 is, for example, a knob extending outside of the housing of the projection apparatus 1, and accordingly a user may rotate the second adjustment member 1253 (knob) to make the second adjustment member 1253 drive (such as push) the second movable guide member 1251 to move towards the second axial direction A2.

Summarily, in the embodiment, the first through hole 1211 extends along the second axis direction A2 which is substantially perpendicular to the first axial direction A1, and the second through hole 1212 extends along the first axis direction A1 which is substantially perpendicular to the second axial direction A2. Thus, when the first movable guide member 1241 moves towards the first axial direction A1, the second guide pillar 1252 may pass through the second through hole 1212 extending along the first axis direction A1 and may not interfere with the plate 121. Similarly, when the second movable guide member 1251 moves towards the second axial direction A2, the first guide pillar 1242 may pass through the first through hole 1211 extending along the second axis direction A2 and may not interfere with the plate 121.

As shown in FIGS. 2 to 5, the lens module 12 of the embodiment further includes at least one first guide rail 126, at least one second guide rail 127, at least one first slidable groove 129, and at least one second slidable groove 130. In the embodiment, the first guide rail 126 is disposed between the optical engine housing 111 and the first movable guide member 1241, and the second guide rail 127 is disposed between the optical engine housing 111 and the second movable guide member 1251. In the embodiment, the first slidable groove 129 is disposed on the first movable guide member 1241 and may be movably disposed on the first guide rail 126; and the second slidable groove 130 is disposed on the second movable guide member 1251 and may be movably disposed on the second guide rail 127. In the embodiment, through the first slidable groove 129 moving on the first guide rail 126, the first movable guide member 1241 may move between the optical engine housing 111 and the plate 121. In the embodiment, through the second slidable groove 130 moving on the second guide rail 127, the second movable guide member 1251 may move between the optical engine housing 111 and the plate 121.

Specifically, in the embodiment, the first guide rail 126 is disposed on the optical engine housing 111 and extends along the first axis direction A1, and the first slidable groove 129 extends along the first axis direction A1 and matches with the first guide rail 126. In the embodiment, the second guide rail 127 is disposed on the optical engine housing 111 and extends along the second axis direction A2, and the second slidable groove 130 extends along the second axis direction A2 and matches with the second guide rail 127. In the embodiment, when the first movable guide member 1241 is driven by an external force, the first movable guide member 1241 may move along the first guide rail 126 towards the first axial direction A1 through the first slidable groove 129. In the embodiment, when the second movable guide member 1251 is driven by an external force, the second movable guide member 1251 may move along the second guide rail 127 towards the second axial direction A2 through the second slidable groove 130. In the embodiment, Teflon adhesive may be coated between the first guide rail 126 and the first slidable groove 129, and Teflon adhesive may be coated between the second guide rail 127 and the second slidable groove 130. Thus, the lubricating effects between the first guide rail 126 and the first slidable groove 129 as well as between the second guide rail 127 and the second slidable groove 130 are improved and accordingly the friction generated during the adjustment process is reduced, thereby achieving the effect(s) of force saving, labor saving or/and power saving.

In the embodiment, the number/quantity of the first through hole 1211 of the plate 121 is two for example, and the number/quantity of the second through hole 1212 of the plate 121 is two for example. The first through holes 1211 are arranged along the second axis direction A2 and the second through holes 1212 are arranged along the first axis direction A1. In the embodiment, the number/quantity of the first guide pillar 1242 of the first position adjusting device 124 is two for example, and the number/quantity of the second guide pillar 1252 of the second position adjusting device 125 is two for example. The first guide pillars 1242 respectively pass through the first through holes 1211 (i.e. each of the first guide pillars 1242 passes through the corresponding first through holes 1211), and the second guide pillars 1252 respectively pass through the second through holes 1212 (i.e. each of the second guide pillars 1252 passes through the corresponding second through holes 1212). For example, two first guide rails 126, two second guide rails 127, two first slidable grooves 129, and two second slidable grooves 130 are implemented in the embodiment However, the number(s) of the first through hole, the second through hole, the first guide pillar, the second guide pillar, the first guide rail, the second guide rail, the first slidable groove, and the second slidable groove are not limited in the invention and are adjustable (increased or decreased) according to an actual situation.

In the embodiment, the movement/motion range of the plate 121 may depend on the extending distance of the first through hole 1211 along the second axis direction A2 and the extending distance of the second through hole 1212 along the first axis direction A1. That is to say, the longer distances the first through hole 1211 extends along the second axis direction A2 and the second through hole 1212 extends along the first axis direction A1 (the longer distance the first through hole 1211 extends along the second axis direction A2 and the longer distance the second through hole 1212 extends along the first axis direction A1), the larger movement/motion range the plate 121 may move. On the contrary, the shorter distances the first through hole 1211 extends along the second axis direction A2 and the second through hole 1212 extends along the first axis direction A1 (the shorter distance the first through hole 1211 extends along the second axis direction A2 and the shorter distance the second through hole 1212 extends along the first axis direction A1), the smaller movement/motion range the plate 121 may move. In the embodiment, the first axial direction A1 is, for example, a vertical direction and the second axis direction A2 is, for example, a horizontal direction; however, the invention is not limited thereto. In another embodiment, the first axial direction A1 may be, for example, a horizontal direction and the second axis direction A2 may be, for example, a vertical direction; wherein the first axial direction A1 and the second axis direction A2 are perpendicular to each other.

In the embodiment, the first position adjusting device 124 and the second position adjusting device 125 have the similar structures. A major difference is that the first position adjusting device 124 and the second position adjusting device 125 have different disposing positions. Specifically, the first position adjusting device 124 is disposed, for example, on the first side (that is, the above of the optical engine housing 111 as illustrated in FIG. 2) of the optical engine housing 111 and the second position adjusting device 125 is disposed, for example, on the second side (that is, the right of the optical engine housing 111 as illustrated in FIG. 2) adjacent to the first side of the optical engine housing 111, but the invention is not limited thereto. In other words, the disposing positions of the first position adjusting device 124 and the second position adjusting device 125 are adjustable according to an actual situation.

As shown in FIGS. 2 and 5, the number/quantity of the slide assembly 123 of the embodiment is, for example, four. The slide assemblies 123 are respectively disposed at the different corners of the optical engine housing 111. Specifically, the slide assemblies 123 are respectively disposed at the four corners of the surface of the optical engine housing 111 facing the plate 121. However, the number of the slide assembly 123 is not limited in the invention is not limited. In other words, the number of the slide assembly 123 is adjustable according to an actual situation. In the embodiment as shown in FIG. 2, each slide assembly 123 includes a housing 1231, an elastic member 1232, and a rolling member 1233. In the embodiment, the housing 1231 is disposed between the plate 121 and the optical engine housing 111, and the housing 1231 has an opening O facing the plate 121. In the embodiment, the elastic member 1232 is disposed in the housing 1231, and rolling member 1233 is disposed on the housing 1231 and located between the elastic member 1232 and the plate 121. In the embodiment, through the elastic resilience force of the elastic member 1232, a portion of the rolling member 1233 may be exposed from the opening O and contact the plate 121; thus, the plate 121 is movably disposed on the optical engine housing 111 through the slide assembly 123. In the embodiment, the elastic member 1232 may be a spring and the rolling member 1233 may be a metal ball for example, but the invention is not limited thereto.

In the embodiment as shown in FIGS. 2 and 5, the lens module 12 of the projection apparatus 1 further includes a plurality of fixing members 128; the plate 121 further has a plurality of via holes 1213; and the optical engine housing 111 has a plurality of fixing holes 1110. In the embodiment, the via holes 1213 respectively correspond to the fixing holes 1110. Specifically, the fixing members 128 respectively pass through the via holes 1213 for each fixing members 128 being fixed to the corresponding fixing hole 1110,; thus, the plate 121 may be movably disposed on the optical engine housing 111 through contacting the rolling member 1233 of the slide assembly 123. In the embodiment, the extending length of each via hole 1213 along the second axial direction A2 is, for example, smaller than the extending length of the first through hole 1211 along the second axial direction A2 and the extending length of each via hole 1213 along the first axial direction A1 is, for example, smaller than the extending length of the second through hole 1212 along the first axial direction A1. Thus, through the aforementioned structural design, the plate 121 of the lens module 121 may move within an appropriate range in the first axial direction A1 or in the second axial direction A2, thereby preventing the guide pillars 1242 and 1252 from directly colliding the inner walls of the through holes 1211 and 1212. For example, as described above, the extending length of the via hole 1213 along the first axial direction A1 is smaller than the extending length of the second through hole 1212 along the first axial direction A1; thus, when the plate 121 moves towards the first axial direction A1, the fixing member 128 may be against the inner wall of the via hole 1213 to make the plate 121 stop moving firstly, and furthermore the second guide pillar 1252 may be prevented from contacting the inner wall of the second through hole 1212. Similarly, as described above, the extending length of the via hole 1213 along the second axial direction A2 is smaller than the extending length of the first through hole 1211 along the second axial direction A2; thus, when the plate 121 moves towards the second axial direction A2, the fixing member 128 may be against the inner wall of the via hole 1213 to make the plate 121 stop moving firstly, and furthermore the first guide pillar 1242 may be prevented from contacting the inner wall of the first through hole 1211.

In summary, in the embodiments of the invention, the lens module in the projection apparatus of may have a movement/motion of two-dimensional (for example, horizontal and/or vertical) direction by using the position adjusting device. In the embodiment of the invention, through the guide pillar of the position adjusting device passing through the through hole of the plate and the slide assembly being disposed between the optical engine housing and the plate, the guide pillar may drive the plate to move on the slide assembly along the horizontal direction and/or vertical direction when the movable guide member of the position adjusting device is forced/driven by an external force. Thus, the projection apparatus of the embodiments of the invention may make the lens module thereof have adjustment function of two-dimensional direction by a single plate. Compared with the conventional projection apparatus equipped with two plates, the projection apparatus of the embodiments of the invention has simple structure and lower component cost and the lens module of the embodiments of the invention may move in the horizontal direction or vertical direction through a single plate. Additionally, in the embodiments of the invention, the plate would not directly contact the optical engine housing due to that the slide assembly is disposed between the optical engine housing and the plate; thus, when the lens module moves, a damage caused by friction between the optical engine housing and the plate of the lens module is avoided.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projection apparatus, comprising:
   a light source, configured to provide an illumination beam;
   an optical engine module, comprising:
      an optical engine housing; and
      a light valve, accommodated in the optical engine housing, and configured to convert the illumination beam into an image light beam; and
   a lens module, configured to convert the image light beam into a projection beam, the lens module comprising:
      a plate, having at least one first through hole;
      a lens, fixed to the plate;
      at least one slide assembly, disposed between the plate and the optical engine housing, wherein the plate is movably disposed on the optical engine housing through the slide assembly; and
      a first position adjusting device, comprising:
         a first movable guide member, movably disposed between the plate and the optical engine housing; and
         at least one first guide pillar, disposed on the first movable guide member and passing through the first through hole, wherein the first movable guide member is configured to be forced to move towards a first axial direction, thereby making the first guide pillar drive the plate to move on the slide assembly along the first axial direction relative to the optical engine housing;
      wherein the first through hole extends along a second axial direction, the plate further has at least one second through hole, the second through hole extends along the first axial direction, and the second axial direction is substantially perpendicular to the first axial direction.

2. The projection apparatus according to claim 1, wherein the first position adjusting device further comprises:
   a first adjustment member, coupled to the first movable guide member, configured to drive the first movable guide member to move towards the first axial direction, thereby making the first guide pillar drive the plate to move on the slide assembly along the first axial direction.

3. The projection apparatus according to claim 1, wherein the lens module further comprises a second position adjusting device, the second position adjusting device comprises:
   a second movable guide member, movably disposed between the plate and the optical engine housing; and
   at least one second guide pillar, disposed on the second movable guide member and passing through the second through hole, wherein the second movable guide member is configured to be forced to move towards the second axial direction, thereby the second guide pillar drives the plate to move on the slide assembly along the second axial direction relative to the optical engine housing.

4. The projection apparatus according to claim 3, wherein the second position adjusting device further comprises:
   a second adjustment member, coupled to the second movable guide member, configured to drive the second movable guide member to move towards the second axial direction, thereby making the second guide pillar drive the plate to move on the slide assembly along the second axial direction.

5. The projection apparatus according to claim 3, wherein the lens module further comprises:
   at least one first guide rail, disposed between the optical engine housing and the first movable guide member;
   at least one second guide rail, disposed between the optical engine housing and the second movable guide member;
   at least one first slidable groove, disposed on the first movable guide member and movably disposed on the first guide rail; and
   at least one second slidable groove, disposed on the second movable guide member and movably disposed on the second guide rail,
   wherein through the first slidable groove moving on the first guide rail, the first movable guide member moves between the optical engine housing and the plate,
   wherein through the second slidable groove moving on the second guide rail, the second movable guide member moves between the optical engine housing and the plate.

6. The projection apparatus according to claim 1, wherein a quantity of the at least one slide assembly is plural, each of the slide assemblies comprises:
   a housing, disposed between the plate and the optical engine housing, wherein the housing has an opening facing the plate;
   an elastic member, disposed in the housing; and
   a rolling member, disposed on the housing and located between the elastic member and the plate, wherein through an elastic resilience force of the elastic member, a portion of the rolling member is exposed from the opening.

7. The projection apparatus according to claim 1, wherein the lens module further comprises a plurality of fixing members, the plate further has a plurality of via holes, the optical engine housing has a plurality of fixing holes, and the via holes respectively correspond to the fixing holes, wherein each of the fixing members is fixed to the corresponding fixing hole by passing through the corresponding via hole, so that the plate is movably disposed on the optical engine housing through contacting the slide assembly.

8. A lens module, adapted to a projection apparatus, the lens module comprising:
   a plate, having at least one first through hole;
   a lens, fixed to the plate;
   at least one slide assembly, disposed between the plate and an optical engine housing of the projection apparatus, wherein the plate is movably disposed on the optical engine housing through the slide assembly; and a first position adjusting device, comprising:
- a first movable guide member, movably disposed between the plate and the optical engine housing; and
- at least one first guide pillar, disposed on the first movable guide member and passing through the first through hole, wherein the first movable guide member is configured to be forced to move towards a first axial direction, thereby the first guide pillar drives the plate to move on the slide assembly along the first axial direction relative to the optical engine housing;

wherein the first through hole extends along a second axial direction, the plate further has at least one second through hole, the second through hole extends along the first axial direction, and the second axial direction is substantially perpendicular to the first axial direction.

9. The lens module according to claim 8, wherein the first position adjusting device further comprises:
a first adjustment member, coupled to the first movable guide member, configured to drive the first movable guide member to move towards the first axial direction, thereby making the first guide pillar drive the plate to move on the slide assembly along the first axial direction.

10. The lens module according to claim 8, further comprising:
a second position adjusting device, comprising:
- a second movable guide member, movably disposed between the plate and the optical engine housing; and
- at least one second guide pillar, disposed on the second movable guide member and passing through the second through hole, wherein the second movable guide member is configured to be forced to move towards the second axial direction, thereby the second guide pillar drives the plate to move on the slide assembly along the second axial direction relative to the optical engine housing.

11. The lens module according to claim 10, wherein the second position adjusting device further comprises:
a second adjustment member, coupled to the second movable guide member, configured to drive the second movable guide member to move towards the second axial direction, thereby making the second guide pillar drive the plate to move on the slide assembly along the second axial direction.

12. The lens module according to claim 10, further comprising:
at least one first guide rail, disposed between the optical engine housing and the first movable guide member;
at least one second guide rail, disposed between the optical engine housing and the second movable guide member;
at least one first slidable groove, disposed on the first movable guide member and movably disposed on the first guide rail; and
at least one second slidable groove, disposed on the second movable guide member and movably disposed on the second guide rail,
wherein through the first slidable groove moving on the first guide rail, the first movable guide member moves between the optical engine housing and the plate,
wherein through the second slidable groove moving on the second guide rail, the second movable guide member moves between the optical engine housing and the plate.

13. The lens module according to claim 8, wherein a quantity of the at least one slide assembly is plural, each of the slide assemblies comprises:
- a housing, disposed between the plate and the optical engine housing, wherein the housing has an opening facing the plate;
- an elastic member, disposed in the housing; and
- a rolling member, disposed on the housing and located between the elastic member and the plate, wherein through an elastic resilience force of the elastic member, a portion of the rolling member is exposed from the opening.

14. The lens module according to claim 8, further comprising a plurality of fixing members, wherein the plate further has a plurality of via holes, the optical engine housing has a plurality of fixing holes, and the via holes respectively correspond to the fixing holes, wherein each of the fixing members is fixed to the corresponding fixing hole by passing through the corresponding via hole, so that the plate is movably disposed on the optical engine housing through contacting the slide assembly.

15. A projection apparatus, comprising:
a light source, configured to provide an illumination beam;
an optical engine module, comprising:
- an optical engine housing; and
- a light valve, accommodated in the optical engine housing, and configured to convert the illumination beam into an image light beam; and
a lens module, configured to convert the image light beam into a projection beam, the lens module comprising:
- a plate, having at least one first through hole;
- a lens, fixed to the plate;
- a plurality of slide assemblies, disposed between the plate and the optical engine housing, wherein the plate is movably disposed on the optical engine housing through the slide assemblies, each of the slide assemblies comprises:
  - a housing, disposed between the plate and the optical engine housing, wherein the housing has an opening facing the plate;
  - an elastic member, disposed in the housing; and
  - a rolling member, disposed on the housing and located between the elastic member and the plate, wherein through an elastic resilience force of the elastic member, a portion of the rolling member is exposed from the opening; and
- a first position adjusting device, comprising:
  - a first movable guide member, movably disposed between the plate and the optical engine housing; and
  - at least one first guide pillar, disposed on the first movable guide member and passing through the first through hole, wherein the first movable guide member is configured to be forced to move towards a first axial direction, thereby making the first guide pillar drive the plate to move on the slide assembly along the first axial direction relative to the optical engine housing.

16. A lens module, adapted to a projection apparatus, the lens module comprising:
a plate, having at least one first through hole;
a lens, fixed to the plate;
a plurality of slide assemblies, disposed between the plate and an optical engine housing of the projection apparatus, wherein the plate is movably disposed on the optical engine housing through the slide assemblies, each of the slide assemblies comprises:
  a housing, disposed between the plate and the optical engine housing, wherein the housing has an opening facing the plate;
  an elastic member, disposed in the housing; and
  a rolling member, disposed on the housing and located between the elastic member and the plate, wherein through an elastic resilience force of the elastic member, a portion of the rolling member is exposed from the opening; and
a first position adjusting device, comprising:
  a first movable guide member, movably disposed between the plate and the optical engine housing; and
  at least one first guide pillar, disposed on the first movable guide member and passing through the first through hole, wherein the first movable guide member is configured to be forced to move towards a first axial direction, thereby the first guide pillar drives the plate to move on the slide assembly along the first axial direction relative to the optical engine housing.

\* \* \* \* \*